United States Patent
Childs

(10) Patent No.: US 6,196,916 B1
(45) Date of Patent: Mar. 6, 2001

(54) COMBINE CROP CONVEYOR WITH IMPROVED FEED DRUM CHAIN GUIDES

(75) Inventor: Kurt E. Childs, Lee's Summit, MO (US)

(73) Assignee: Agco Corporation, Independence, MO (US)

(*) Notice: Subject to any disclaimer, the term of this patent is extended or adjusted under 35 U.S.C. 154(b) by 0 days.

(21) Appl. No.: 09/303,854

(22) Filed: May 3, 1999

(51) Int. Cl.[7] ................ A01F 12/00; B02B 7/02
(52) U.S. Cl. ............... 460/16; 460/70; 474/140; 56/119
(58) Field of Search ............... 460/16, 70, 114; 474/91, 140, 94; 56/59, 66, 69, 75, 78, 82, 88, 93, 106, 108, 118, 119; 198/842, 840; 424/124, 129, 140

(56) References Cited

U.S. PATENT DOCUMENTS

| | | | |
|---|---|---|---|
| 915,953 | * 3/1909 | Hall | 474/140 |
| 1,781,750 | * 11/1930 | Dodge et al. | 198/841 |
| 2,117,195 | * 5/1938 | McKerlie | 474/140 |
| 2,410,611 | * 11/1946 | Pratt et al. | 198/840 |
| 3,780,851 | 12/1973 | Bichel et al. | |
| 3,854,572 | 12/1974 | Maiste . | |
| 3,967,719 | * 7/1976 | Kloefkorn et al. | 198/175 |
| 4,008,801 | * 2/1977 | Reilly et al. | 198/841 |
| 4,199,924 | 4/1980 | Eistert et al. | |
| 4,736,833 | 4/1988 | Tanis . | |
| 4,908,002 | 3/1990 | Tanis . | |
| 5,346,429 | 9/1994 | Farley . | |
| 5,478,277 | 12/1995 | Kloefkorn . | |
| 5,720,682 | * 2/1998 | Tada | 474/91 |

* cited by examiner

Primary Examiner—Robert E. Pezzuto
Assistant Examiner—Arpad Fabian Kovacs
(74) Attorney, Agent, or Firm—Shughart Thomson & Kilroy P.C.

(57) ABSTRACT

A combine chain and slat crop conveyor includes a plurality of feed drum chain guides. Each chain guide is a generally cylindrical ring which encircles and is attached to the conveyor feed drum and is shaped as a "W" in cross section. Each chain guide includes two outer flanges which extend away from the feed drum surface at an angle, e.g. in a range from 20 to 70 degrees from parallel with the drum surface. The angled outer flanges insure that, as a chain starts to wander out of its path, it will get tighter, which forces it back toward the center of the guide ring. Each guide ring also has an elevated center portion which directly contacts the chain rollers, thus providing a rolling surface for the chain rollers, which puts all relative rolling motion and metal to metal contact between chain roller and roller pin.

5 Claims, 2 Drawing Sheets

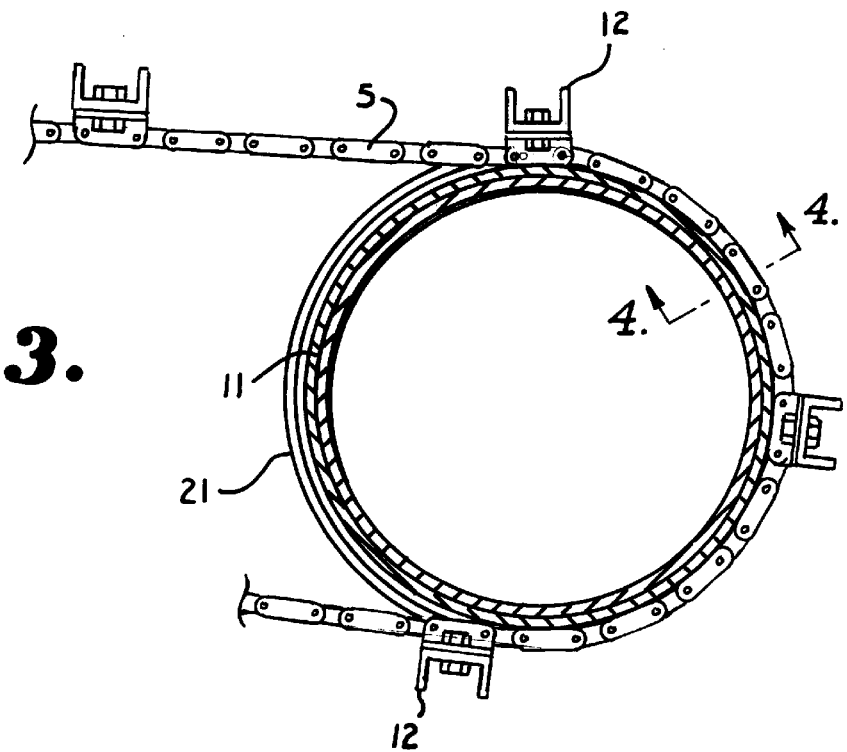
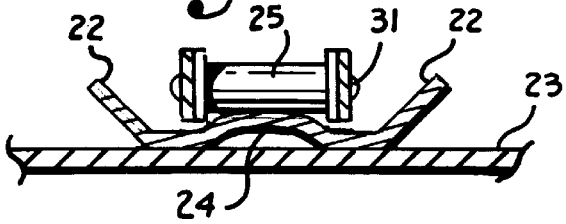
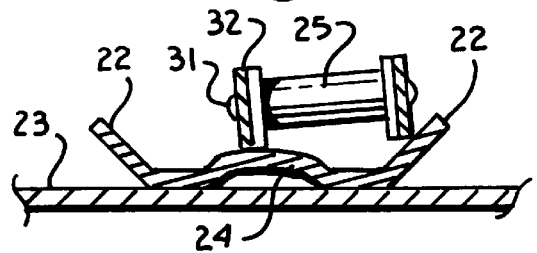

COMBINE CROP CONVEYOR WITH IMPROVED FEED DRUM CHAIN GUIDES

FIELD OF THE INVENTION

The present invention relates to a combine crop conveyor which conveys crop material from a header to the combine, and, more particularly, to a modified feed drum for such a crop conveyor. The feed drum is modified to include a plurality of drum encircling chain guides, each of which is shaped generally as a "W". Each chain guide acts to keep its respective chain running in a set path defined by a center leg of the W and the angled outer flanges of each chain guide tend to force the chain back toward the center track whenever the chain starts to wander.

BACKGROUND OF THE INVENTION

Agricultural harvester/threshers or "combines" are typically equipped with harvesting "headers" which include a cutter mechanism for cutting the crop and a feeder mechanism which feeds the cut crop into the combine feeder housing mounted on the front of the combine. The cut crop material is conveyed into the combine via a feeder housing which includes a chain driven crop feeder conveyor. These crop feeder conveyors typically take the form of "chains and slats" in which multiple, parallel chains, e.g. two, three or more, are each entrained around respective coaxial rear drive sprockets and a forward feed drum. The chains are linked together by transverse slats which are operative to move the crop from an inlet of the feeder housing upward along the floor thereof and into the threshing chambers of the combine. Typically, a welded cylindrical guide ring, which resembles a simple rectangular tooth in cross section, is placed around the periphery of the feed drum just outboard (or inboard) of each chain location to help hold the respective chain in position about the feed drum.

A number of problems occur in these prior art chain and slat crop conveyors. For example, it is difficult to keep the chains running straight, i.e. the chains tended to wander from side to side and often rode up and over the welded guide rings "teeth". This chain wandering often causes the chain to jump a tooth on the drive sprocket, which stretches it and drastically reduces chain life. In these prior art systems, the side bars of each chain run directly on the surface of the feed drum. The metal to metal contact between the chain side bars and the feed drum surface which occurs due to the relative motion between the chain side bars and the feed drum causes the feed drums to wear rapidly. Repair or replacement of chains and/or drum is an expensive exercise which necessitates dismantling of the feeder housing and consequent machine down time.

At least one attempt has been made to address this problem, as reflected in U.S. Pat. No. 5,346,429 to Herb Farley, and entitled FEEDER ASSEMBLY FOR A COMBINE. In the Farley patent, a series of elastomeric chain supports are positioned around the feed drum. Each of the chain supports is cylindrical in shape and includes a central chain supporting rim positioned between outer, larger circumference annular rims such that a respective track is formed for accommodating each chain. The chain supports in the Farley patent are designed to be noise reducing due to the elastomeric material, however, they have a limited life due to their resilient nature. Accordingly, relatively frequent replacement of the wear rings is required. Furthermore, the annular rims of the chain supports in the Farley patent are perpendicular to the drum surface, and thus do not provide any chain tensioning as the chains start to wander, i.e. the chains can jump over the annular rims just as they do the prior art guide teeth.

It is clear then, that an improved combine crop feeder conveyor is needed. Such a crop feeder conveyor should include chain guide rings about the feed drum which are durable, which prevent the chain side bars from direct metal to metal contact with the drum or guide ring surface and which prevent tend to keep the chains running straight, thus preventing them from jumping a tooth in the respective drive sprocket.

SUMMARY OF THE INVENTION

The present invention is directed to a combine chain and slat crop conveyor with improved feed drum chain guides. Each chain guide is a generally cylindrical ring which encircles and is attached to the conveyor feed drum. Each guide ring is shaped as a "W" in cross section, including two outer flanges which extend away from the feed drum surface at an angle, e.g. in a range from 20 to 60 degrees from horizontal. Each guide ring also has an elevated center portion which directly contacts the chain rollers, thus providing a rolling surface for the chain rollers, which puts all relative rolling motion and metal to metal contact between chain roller and roller pin. The angled outer flanges of each guide ring insure that, as a chain starts to wander out of its path, it will get tighter, which forces it back toward the center of the guide ring.

OBJECTS AND ADVANTAGES OF THE INVENTION

The principal objects of the present invention include: providing a combine chain and slat crop conveyor with improved feed drum chain guides; providing such a conveyor which minimizes wear on the conveyor feed drum; providing such a conveyor in which each chain guide is a ring attached to the periphery of the conveyor feed drum, which guide ring is "W" shaped in cross section; providing such a conveyor in which the outer flanges of the W shaped guide rings are angled, which tends to tighten any chain which starts to wander from its designated path centered between the outer flanges; providing such a conveyor in which each guide ring includes an elevated center portion which directly contacts the chain rollers, thus providing a rolling surface for the chain rollers; providing such a conveyor which maximizes feed drum and conveyor chain life; and providing such a conveyor which is simple and economical to manufacture, which is strong and durable and which is particularly well adapted for its intended purpose.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 3 is a cross sectional view, taken along line 3—3 of FIG. 2 and illustrating the feed drum and chain and slat conveyor.

FIG. 4 is a greatly enlarged, fragmentary cross sectional view, taken along line 4—4 of FIG. 3, illustrating the cross sectional shape of the guide ring and showing the chain running in a normal track over the guide ring.

FIG. 5 is a greatly enlarged, fragmentary cross sectional view, also taken along line 4—4 of FIG. 3, again illustrating the cross sectional shape of the guide ring and showing the chain wandering from the designated path and being tightened by the side walls of the W shaped guide ring.

DETAILED DESCRIPTION OF THE INVENTION

As required, detailed embodiments of the present invention are disclosed herein, however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Figure 1:
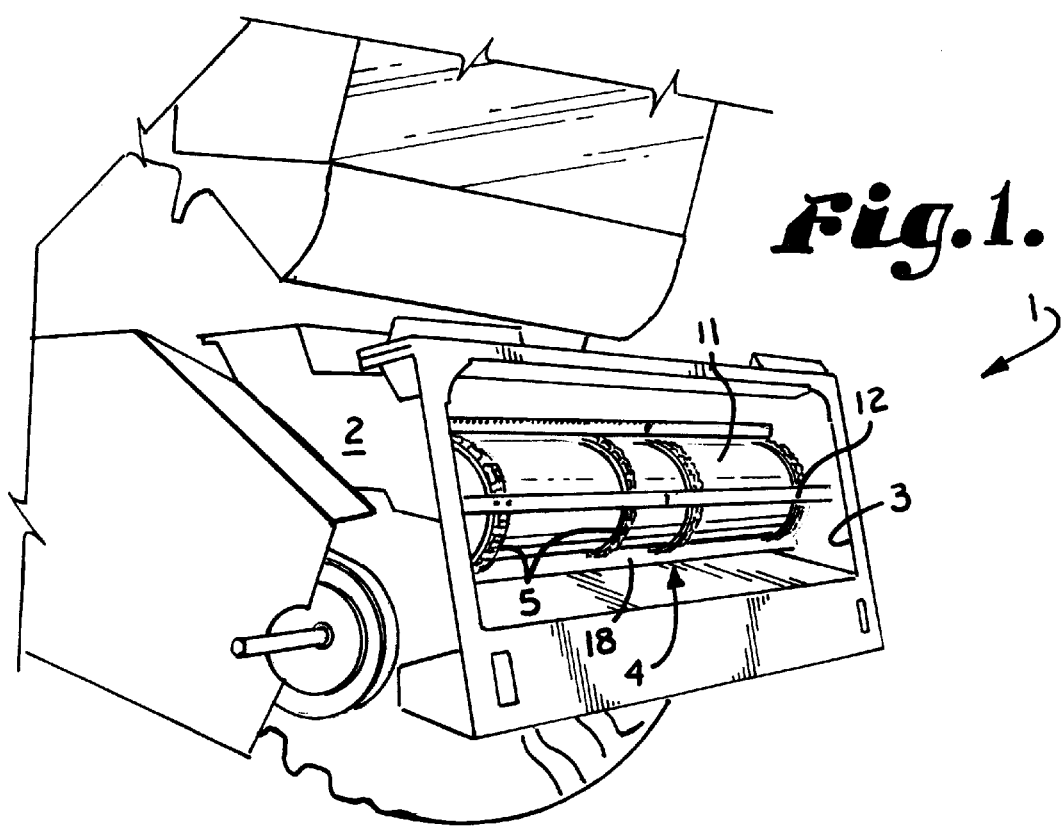
FIG. 1 is a fragmentary, perspective view of a combine illustrating the combine feeder housing, conveyor feed drum and conveyor chains and slats.

Referring to the drawings, and more particularly to FIG. 1, an agricultural combine, generally indicated at 1, includes a crop feeder housing 2 with a rectangular crop receiving opening 3. Crops are fed into the opening 3 from an attached header (not shown) and are conveyed upward within the feeder housing 2 and into the combine interior via a crop feeder conveyor, generally indicated at 4. The conveyor 4 includes a plurality of endless chains 5 which are entrained around a feed drum 11 positioned within the feeder housing 2 near the opening 3. Each of the chains 5 is also entrained about an individual drive sprocket (not shown) positioned in an upper portion of the feeder housing 2, as is conventional.

Figure 2:
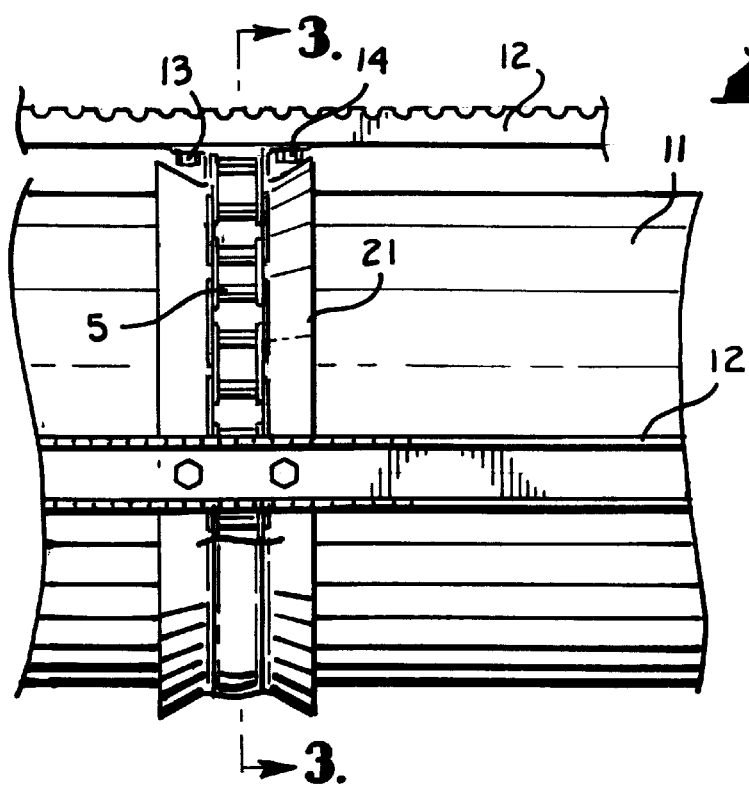
FIG. 2 is a greatly enlarged, fragmentary, front elevational view of a portion of the conveyor feed drum and with one of the guide rings encircling it.

A plurality of crop conveying slats 12 extend between and are connected to pairs of the chains 5. The slats 12 illustrated in FIGS. 1 and 2 are shown as serrated, but other slat designs would work as well. Each slat is attached via bolts 13 to two of the chains 5 via wings 14 which extend outward on either side from each chain 5. The chains are driven in an endless loop about the feed drum 11 and the sprocket (not shown) with a direction which is clockwise as seen in FIG. 3. In other words, the slats 12 move upward along a floor 15 of the feeder housing 2. As crop material (not shown) is deposited into the feeder housing 2 via the opening 3, the slats 12 grab the crop material and convey it along the housing floor 15, upward and rearward into the combine 1.

A plurality of chain guide rings 21 are attached to and encircle the feed drum 11. Each of the chain guide rings 21 is shaped as a W in cross section, as is best illustrated in FIGS. 4 and 5. The guide rings 21 each include two outer flanges 22 which extend away from a surface 23 of the feed drum 11 at an angle from parallel thereto, e.g. in a range from 20 to 70 degrees. Each guide ring 21 also has a raised center portion 24 which directly contacts rollers 25 on the respective chain 5, thus providing a rolling surface for the chain rollers 25. This puts all relative rolling motion between the chain rollers 25 and roller pins 31 which extend through and support the chain rollers 25 in a well known fashion. In other words, there is no metal to metal contact between chain side bars 32 and the guide ring 21 or feed drum 11.

The angled outer flanges 22 of each guide ring 21 insure that, as the respective chain 5 tries to wander out of its path, as shown in FIG. 5, the length of travel for the chain 5 will increase, i.e. the chain will be forced outward away from the feed drum 11 by the contact between chain side bars 32 and the flanges 22 and the center raised portion 24, thus tightening the chain 5 and forcing it back toward the original path shown in FIG. 4. This prevents the chain 5 from wandering far enough to cause it to jump a tooth in its drive sprocket, thus saving considerable wear and tear on the chains 5 and greatly increasing their useful life. At the same time, as mentioned above, the chain guide rings 21 prevent the chain side bars 32 from directly contacting the feed drum surface 23, which greatly increased the life of the drum 11. The guide rings 21 are preferably made of steel or other durable metal and thus have a long life themselves, particularly since they are contacted only by the chain rollers 25 in normal operation.

While the invention has been illustrated on a combine with a four chain crop feeder conveyor, it should be apparent that it would work equally well on any chain and slat conveyor. The particular angle of the outer flanges 22 illustrated is exemplary only and any angle from a wide range of angles would work as long as the desired chain tensioning effect were achieved when the chain starts to wander from its path. It is thus to be understood that while certain forms of the present invention have been illustrated and described herein, it is not to be limited to the specific forms or arrangement of parts described and shown.

I claim:

1. In a combine crop feeder conveyor in which a plurality of endless chains are entrained in respective loops about respective drive sprockets and a common feed drum, with crop material conveying slats extending between the chains, the chains and slats being driven in endless loops to convey crop material up a feeder housing, the improvement comprising:

a) a plurality of chain guide rings attached to and extending around the periphery of the feed drum, a respective one of said chain guide rings being positioned to engage each chain, each of said guide rings comprising:

i) a pair of flanges extending in respective opposite directions outward and upward at an angle greater than parallel with the surface of said feed drum but less than perpendicular to the surface of said feed drum with the engaged chain being accommodated between the flanges such that said flanges act to tension the chain as it wanders from a center position between said flanges; and ii) a raised center portion positioned between said flanges, the raised center portion of each said guide ring being of a width and height such that it is contacted by rollers on the engaged chain when the chain is running in a position centered between said flanges.

2. The improvement as in claim 1, wherein each of said chain guide rings is made of metal and said raised center portion of each of said chain guide rings is of a height which supports the engaged chain with the only metal to metal contact between chain and chain guide ring being between the chain rollers and the raised center portion.

3. The improvement as in claim 1, wherein each outer flange of said chain guide rings extends upward and outward at an angle in the range of 20 to 70 degrees from parallel with the feed drum surface.

4. In a combine crop feeder conveyor in which a plurality of endless chains are entrained in respective loops about respective drive sprockets and a common feed drum, with crop material conveying slats extending between the chains, the chains and slats being driven in endless loops to convey crop material up a feeder housing, the improvement comprising:

a) a plurality of metal chain guide rings attached to and extending around the periphery of the feed drum, a respective one of said chain guide rings being positioned to engage each chain, each of said guide rings comprising:
  i) a pair of flanges extending in respective opposite directions outward and upward at an angle greater than parallel with the surface of said feed drum but less than perpendicular to the surface of said feed drum, with the engaged chain being accommodated between the flanges such that said flanges act to tension the chain as it wanders from a center position between said flanges; and
  ii) a raised center portion positioned between said flanges, the raised center portion of each said guide ring being of a width and height such that it is contacted only by rollers on the engaged chain when the chain is running in a position centered between said flanges with the only metal to metal contact between chain and chain guide ring being between the chain rollers and the raised center portion of the chain guide ring.

5. The improvement as in claim 4, wherein each outer flange of said chain guide rings extends upward and outward at an angle in the range of 20 to 70 degrees from parallel with the feed drum surface.

\* \* \* \* \*